(12) United States Patent
Hernandez et al.

(10) Patent No.: US 11,178,296 B2
(45) Date of Patent: Nov. 16, 2021

(54) MULTIFUNCTIONAL SYSTEM VIA ASSISTIVE COMPUTING DEVICES

(71) Applicant: Toshiba Global Commerce Solutions Holdings Corporation, Tokyo (JP)

(72) Inventors: Guillermo J. Hernandez, Zapopan (MX); Luis Fernando F. Perez Almodovar, Zapopan (MX); Sergio Toscano Lomeli, Zapopan (MX); Julio C. Sanchez Reynaga, Zapopan (MX); Jorge Aragon, Zapopan (MX)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 0 days.

(21) Appl. No.: 16/836,368

(22) Filed: Mar. 31, 2020

(65) Prior Publication Data

US 2021/0306481 A1    Sep. 30, 2021

(51) Int. Cl.
  *G10L 15/30* (2013.01)
  *H04N 1/00* (2006.01)
  *G10L 15/18* (2013.01)
  *G10L 15/22* (2006.01)

(52) U.S. Cl.
  CPC ..... *H04N 1/00403* (2013.01); *G10L 15/1815* (2013.01); *G10L 15/22* (2013.01); *G10L 15/30* (2013.01); *H04N 1/00411* (2013.01); *G10L 2015/223* (2013.01)

(58) Field of Classification Search
  CPC .......... H04N 1/00403; H04N 1/32784; H04N 1/00411; G10L 15/22; G10L 15/30; G10L 2015/223
  USPC ....... 358/1.13, 1.15; 704/9, 201, 270.1, 271, 704/275
  See application file for complete search history.

(56) References Cited

U.S. PATENT DOCUMENTS

| | | | | |
|---|---|---|---|---|
| 2003/0218642 | A1* | 11/2003 | Sakayori | H04N 1/00384 715/853 |
| 2015/0038086 | A1* | 2/2015 | Kim | H04L 63/08 455/41.3 |
| 2019/0149675 | A1* | 5/2019 | Kodimer | G10L 15/22 358/1.13 |

* cited by examiner

*Primary Examiner* — Jamares Q Washington
(74) *Attorney, Agent, or Firm* — Patterson + Sheridan, LLP (57) ABSTRACT

The present disclosure provides for multifunction system (MFS) control via associating a user with a MFS; outputting an initial audio cue based on an initial status of the MFS via an assistive computing device; receiving command inputs; transmitting the command inputs to the MFS; receiving an updated status from the MFS based on the command inputs; and outputting updated audio cues via the assistive computing device based on the updated status and/or via in response to receiving an association request, identifying a user profile; interfacing with an assistive computing device (having a microphone and a speaker) associated with the user profile; receiving an utterance captured by the microphone; locally processing the utterance according to a natural language processor to identify an action intent; performing the action intent via an MFS; and transmitting, for output via the speaker, a status of the MFS performing the action intent.

16 Claims, 9 Drawing Sheets

MULTIFUNCTIONAL SYSTEM VIA ASSISTIVE COMPUTING DEVICES

BACKGROUND

The present disclosure generally relates to multifunctional systems, such as printers, point of sale (POS) terminals, and the like. More particularly, the present disclosure provides for enhanced accessibility and security of use for multifunctional systems.

As multifunctional systems such as printers and POS terminals have expanded in functionality and popularity, access to the options and features of those multifunction systems have grown in complexity. Various manufacturers of multifunction systems have turned to graphical user interfaces (GUIs) to provide users access to the rich functionality of newer multifunction systems. Although efforts have been made to make the GUIs intuitive to the users, some functions remain inaccessible or difficult to access, particularly when buried under several sub-menus or when the user has difficulty seeing the GUI (e.g., due to reduced visual acuity (including blindness) of the user or poor GUI layout for a given display device).

SUMMARY

According to one embodiment of the present invention, a method is provided for multifunction system control that includes: associating a user with a multifunction system; outputting an initial audio interaction cue to the user based on an initial status of the multifunction system via an assistive computing device associated with the user; receiving command inputs from the user; transmitting the command inputs to the multifunction system; receiving an updated status from the multifunction system based on the command inputs; and outputting an updated audio interaction cue to the user via the assistive computing device based on the updated status.

According to one embodiment of the present invention, a method for multifunction system control is provided that includes: in response to receiving an association request, identifying a user profile to activate; interfacing with an assistive computing device associated with the user profile, wherein the assistive computing device includes a microphone and a speaker; receiving raw audio of an utterance captured by the microphone of the assistive computing device; locally processing the utterance according to a natural language processor to identify an action intent included in the utterance; performing the action intent via at least one subsystem of a multifunction system; and transmitting a status of the multifunction system performing the action intent to the assistive computing device for output via the speaker.

According to one embodiment of the present invention, a computing device enabled for multifunction system control is provided that includes: task management hardware; a tactile interface; a processor; and a memory storage device, including instructions, that when executed by the processor provide enable the computing device to perform an operation including: displaying a graphical user interface (GUI) via the tactile interface; in response to receiving an association request, identifying a user profile to activate; interfacing with an assistive computing device associated with the user profile, wherein the assistive computing device includes a microphone and a speaker; receiving raw audio of an utterance captured by the microphone of the assistive computing device; locally processing the utterance according to a natural language processor to identify an action intent included in the utterance; performing the action intent using the task management hardware; and transmitting a status of performing the action intent to the assistive computing device for output via the speaker.

DETAILED DESCRIPTION

The present disclosure provides improved accessibility for multifunction systems, such as printers and POS terminals relying on GUIs, and improved data security in providing the improved accessibility. An assistive computing device, which may be a separate computing device from the multifunction system or a module for a multifunction system, receives utterances from the user, which are offloaded to the multifunction system for natural language processing and implementing the action intents as commands within the multifunction system, and outputs audio signals of the status of the multifunction system to the user. Accordingly, a user can navigate the GUI without having to see the GUI and can provide natural language instructions (or formatted vocal commands) to access functionality of the multifunction printer without having to navigate the GUI.

Figure 1A:
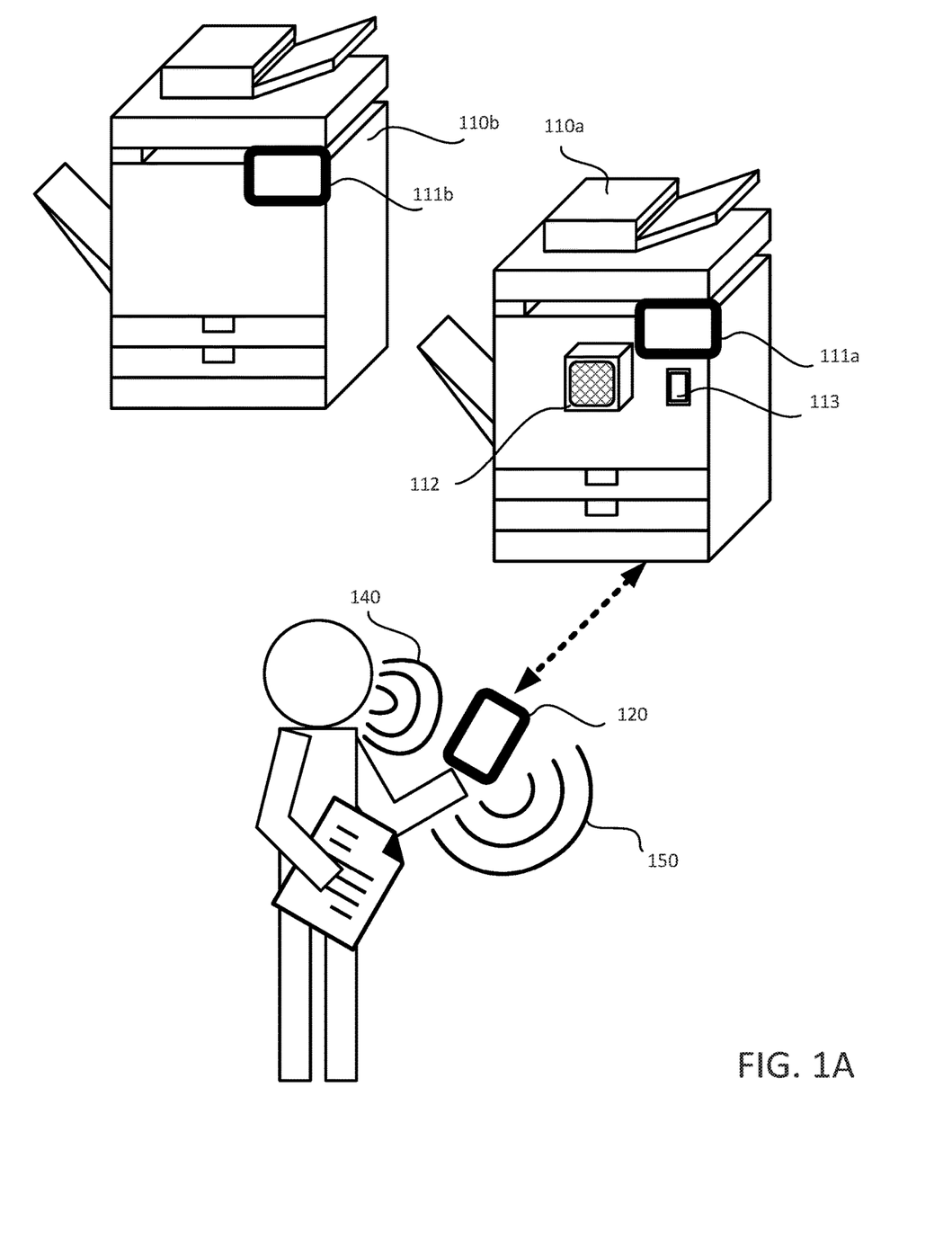
FIGS. 1A-1D illustrate use scenarios for multifunction systems, according to aspects of the present disclosure.
Figure 1B:
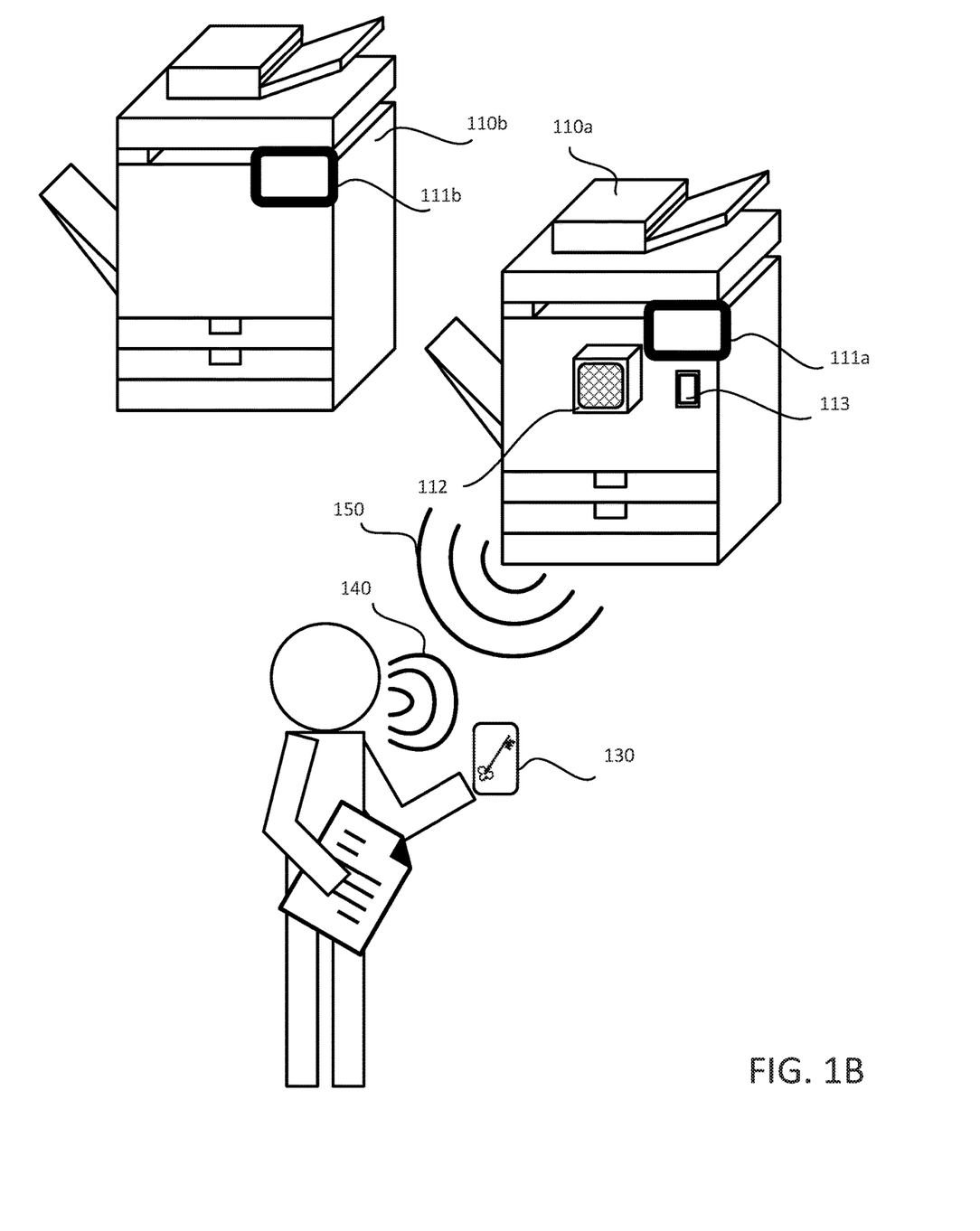

FIGS. 1A and 1B illustrate use scenarios for multifunction printers (MFP), according to aspects of the present disclosure. In each of the scenarios, a user is shown interacting with a first multifunctional system 110a (generally, MFS 110) in a physical environment that includes a second MFS 110b. The MFSs 110 can be connected to one another and other computing devices over a wired or wireless network to receive documents to print documents remotely, but may also be interacted with locally to interact with documents that are physically presented to the MFS 110 (e.g., scanning, copying, faxing). The first MFS 110a and the second MFS 110b each include a respective control panel 111a and 111b (generally, control panel 111), which provides a GUI that a user can interact with to access various functionalities of the respective MFS 110. Example hardware for an MFP style of MFS 110 is discussed in greater detail in regard to FIG. 2A.

Functionalities offered by the MFPs can include: printing, scanning, copying, faxing, emailing, collating, stapling, folding, and otherwise manipulating documents. The particular action that the MFP is to perform may be specified by a user via the control panel 111 by navigating various options, which can include whether the presented document is to be copied, scanned, faxed, etc.; how many copies are to be made; whether the copies are to be in color, black and white, or grayscale; a paper type to make the copies on; a contrast level and/or a brightness level in scanning and/or printing the documents; whether the copies are to be: folded, stapled, collated, single-sided, double-sided, scaled, etc., which tray the copies are to output to, and myriad other options depending on the capabilities and functionalities of the MFP being used. An administrative user can add or remove functionalities and options in some modular MFPs, which the control panel 111 adapts to based on which modules are present and activated. Accordingly, by providing a GUI, rather than a fixed set of physical buttons, the control panel 111 can provide users with an interface that adapts to the capabilities of the associated MFS 110 as those capabilities are updated.

Figure 1C:
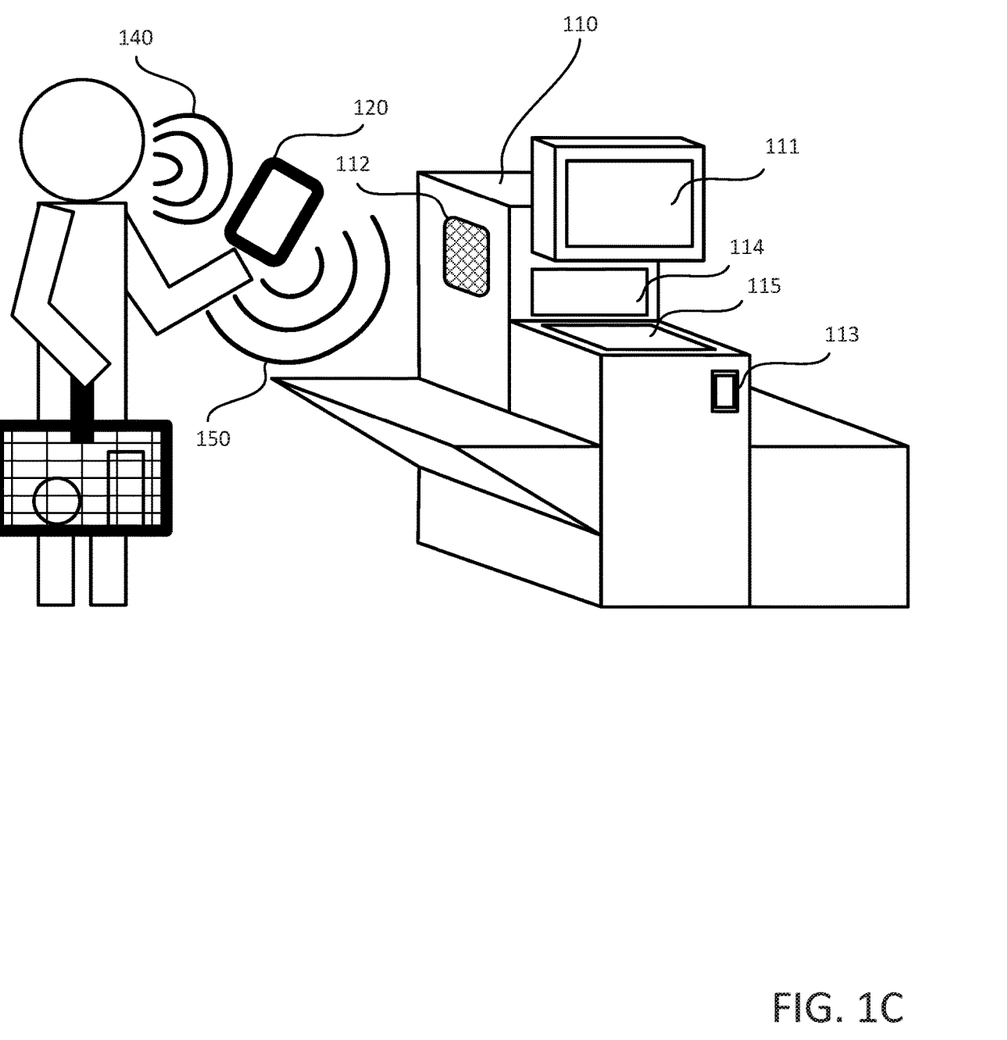
Figure 1D:
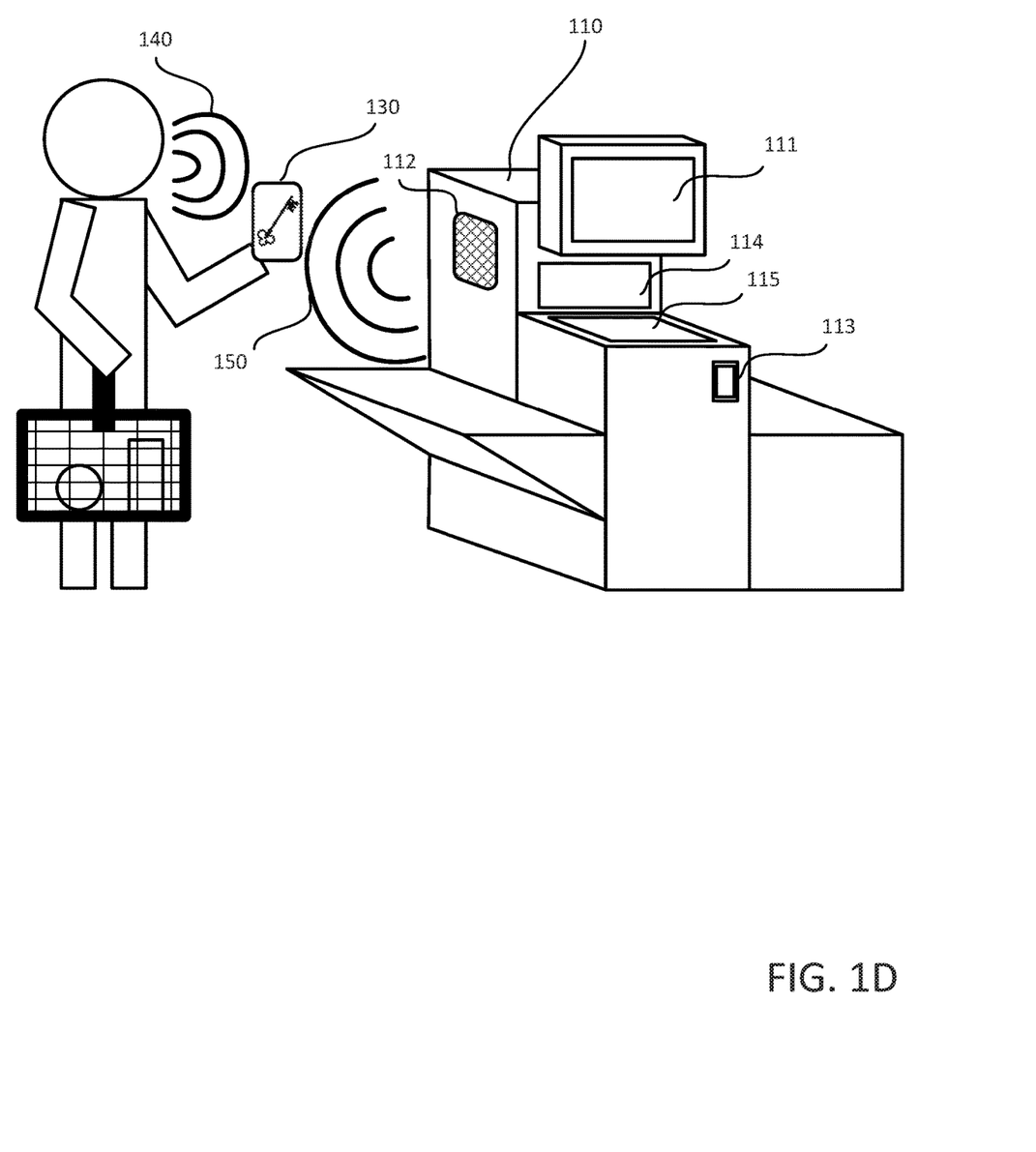

FIGS. 1C and 1D illustrate use scenarios for POS terminals, according to aspects of the present disclosure. In each of the scenarios, a user is shown interacting with an MFS 110, which may include other MFSs 110 (which are not illustrated). The MFS 110 includes a control panel 111, which provides a GUI that a user can interact with to access various functionalities of the MFS 110. Example hardware for a POS terminal style of MFS 110 is discussed in greater detail in regard to FIG. 2B.

Functionalities of the POS terminals can include: identifying items to include or remove from a transaction, identifying weights/sizes of items in a transaction, performing loss prevention activities, moving items to different locations in the terminal (e.g., via a conveyor), ensuring that items identified in a transaction match those provided to a user (e.g., scanned items match bagged items), accepting payment, providing receipts, and the like. Visually impaired users may have particular difficulties in using self-checkout POS terminals, as providing a barcode to a barcode reader 114 or placing an item on a scale 115 can be difficult without being able to see the barcode (or the barcode reader 114) or select what type of item is to be weighed (e.g., via GUI). Similarly, even full-sighted individuals can have difficulties with barcode readers 114 (e.g., not knowing where the barcode is located, obstructions/reflections on the barcode) and scales 115 (e.g., not knowing what item is being weighed). Accordingly, the assistive computing device can help a user identify how to use the POS terminal or to circumvent some of the input requirements. For example, instead of navigating a GUI to identify an item of produce to weigh from a series of menus, a user can state the identity of the item of produce, which the MFS 110 uses as a selection. In another example, instead of navigating a series of menus to select a payment option, a user profile can save a preferred option, which the MFS 110 confirms with the user before completing the transaction. In a further example, the MFS 110 can use partial scanner input in combination with user feedback to identify an item (e.g., a scan of the last half of a barcode in addition to a user-stated identity of an item matching).

In various use cases, however, the user seeking to use the MFS 110 is prevented from using the functionalities of the MFS 110 because the user cannot see the GUI on the control panel 111 (e.g., due to a visual impairment or a malfunction in the control panel 111) or does not know where the desired functionality is located in the GUI (or that the MFS 110 even offers the desired functionality). Therefore, an alternative access scheme is provided via an assistive computing device. The assistive computing device can include user devices 120 as well as vocalization modules 112 of the MFS 110. Example hardware as may be used in an assistive computing device is discussed in greater detail in regard to FIG. 3.

A user may associate an assistive computing device with a use session of an MFS 110 in various ways. For example, a Near Field Communications (NFC) module 113 can identify when a user device 120 (as per FIGS. 1A and 1C) or a keycard 130 (as per FIGS. 1B and 1D) associated with known user credentials is within range of the MFS 110, and automatically establish a use session associated with a user profile associated with the user device 120 or keycard 130. A user may also establish a session via a local area network, when a personal user device 120 and the MFS 110 are served by the same network; transmitting credentials over the network to a specified device, or a physically closest MFS 110 (e.g., determined via a wireless router serving both the user device 120 and the MFS 110). In some aspects, a user may attempt to supply credentials by engaging a vocalization module 112 of the MFS 110 by providing credentials in utterances 140 (i.e., spoken language) and receiving confirmation (or requests for additional details/credentials) via audio outputs 150 from the vocalization module 112. In various aspects, the audio outputs 150 can include machine-generated or pre-recorded speech and non-speech sounds (e.g., sequences of beeps/whistles/clicks, music, various tones) used to communicate the status of the MFS 110 to the user and/or to identify which MFS 110 is responding to which user in an environment with multiple MFSs 110.

When establishing a use session with an MFS 110 via a user device 120, the user can specify in the provided credentials whether to use the vocalization module 112, the user device 120, or a separate user device 120 as the assistive computing device. For example, a user may carry a cell phone and a tablet computer, and is recognized and logged into the MFS 110 via the cell phone (and data carried thereon for automatic association of the user with the MFS 110), but the user can specify (as part of the login process or via the data carried by the keycard 130) whether to use the vocalization module 112, the cell phone, the tablet, or accessibility device as the assistive computing device.

When establishing a use session with an MFS 110 via a keycard 130, the user can specify in the provided credentials whether to use the vocalization module 112 or a user device 120 as the assistive computing device. For example, a user may carry both a cell phone and a keycard 130, log into the MFS 110 via the keycard 130, and specify (as part of the login process or via the data carried by the keycard 130) to use the cell phone as the assistive computing device.

When interacting with an MFS 110 via an assistive computing device, the user can issue commands via button presses on the assistive computing device and/or by utterances 140 (including by natural language requests and by formatted language commands). These commands are transmitted to the MFS 110 that the user is associated with (and not to other MFSs 110 in the environment, or other MFSs 110 in the environment can ignore commands received from non-associated assistive computing devices or users), which interprets the commands as though originally provided through the GUI or directly implements the command without consulting the GUI. In various aspects, the user can provide commands using only button presses, only utterances 140, or combinations of utterances 140 and button presses.

For example, a user of a personal user device 120 with a touchscreen (e.g., a smart phone or a tablet computer) can input commands through an alternative GUI that is easier to see than the GUI provided on the control panel 111 of the MFS 110. Examples of alternative GUIs include: colorblind modes of the GUI, scaled-up versions of the GUI (e.g., for assistive computing devices with larger form factors of displays than the control panel 111), zoomed-in views of the GUI, zoomed-out view of the GUI (e.g., showing buried or next/previous levels of the GUI provided by the control panel 111). In an alternative GUI, the inputs from the user on the assistive computing device are transmitted to the MFS 110, and are interpreted as though input on the interface of the MFS 110.

In a further example, a user of a personal user device 120 with physical buttons (e.g., the volume and home buttons on a mobile phone or tablet computer) can employ an application to reconfigure those physical buttons to provide commands to the MFS 110 in conjunction with the GUI. For example, a user (who may be blind) can use volume up and volume down buttons on a personal user device 120 to navigate in the GUI provided on the MFS 110. Additional buttons can provide additional functionality (e.g., up/down, left/right, increment/decrement, approve/cancel, etc.) and the user can also provide utterances 140 to provide additional navigation/selection within the GUI.

In an additional example, a user can choose to provide inputs to the MFS 110 by utterances 140 (e.g., to a microphone associated with a user device 120 and/or a vocalization module 112). In some aspects, the utterances 140 can provide natural language communications that the assistive computing device transmits to the MFS 110 to extract an action intent from. The raw audio of the user speaking the utterance 140 (and any background noises also captured) is captured by the assistive computing device, transferred to the MFS 110, and is processed to identify one or more action intents in the utterance 140. For example, when a user says "I want six copies, not color, using A4 paper," the MFS 110 of an MFP can extract action intents from the utterance 140 indicating that the user desires that copies be made of a provided document, that the desired action is to be repeated six times, that a grayscale or black and white color scheme is to be used, and that a particular size of paper is to be used. In some aspects, the utterances 140 can be paired with audio outputs 150 to provide a call-and-response input/output sequence using formatted language. For example, when an audio output 150 of "Please confirm: print six copies in grayscale using paper from tray two" is output to the user, the user can speak an utterance of "Confirm" to cause the MFP to print six grayscale copies using paper from tray two, or "Cancel" to not perform that action. Additionally or alternatively, an audio output 150 is provided to the user to "Please confirm: print six copies in grayscale using paper from tray two," to which the user replies via a physical button press (e.g., selecting a first button associated with confirmation or a second button associated with cancellation) to cause the MFP to print or not print as directed.

In various aspects, the assistive user device offloads processing of the utterances 140 to the MFS 110 due to the complexity in performing natural language speech processing and the comparatively greater processing power of an MFS 110 relative to a user device 120. In some aspects, a user device 120 may offer speech recognition, but generally, smaller form-factor user devices 120 (such as cell phones, tablets, accessibility devices, and other hand-portable device) rely on cloud-based natural language speech processing services to perform the calculations to convert raw audio into estimated action intents and a voice assistant application to handle the collection and transmission of the raw audio from the user device 120 to the cloud backend.

Various voice assistant applications can be included in or integrated with the hardware or operating system of the user device 120, which provides a convenient interface to collect utterances 140 and provide audio outputs 150, but can also introduce security concerns if the third party offering the cloud-based audio analysis is not-trusted to be secure (either through maliciousness or negligence). These security concerns can be particularly acute in voice assistant application that have an "always on" or "listening" mode, especially when used in facilities where sensitive or secretive material are discussed. In some cases, the voice assistant application is "always on" to respond to an activation phrase before transitioning to an active mode. In some cases, the voice assistant is "always on" in the active mode so as to be able to respond to action intents without having to receive an activation phrase. When in the active mode, the voice assistant application records raw audio for analysis by the cloud-based backend to identify an action intent, but may capture sensitive material inadvertently (e.g., in a background conversation and/or after the intended utterance 140 concludes).

To improve the security of a user device 120 for use as an assistive computing device, the MFS 110 can interact with the user device 120 through a bypass application that uses the input/output functionality of the voice assistant application, but bypasses the voice assistant application's transmissions to/from a cloud-based service in favor of a natural language processor implemented on the MFS 110. The bypass application on the user device 120 prevents transmissions from the voice assistant application to the cloud-based service, and redirects those communications to the MFS 110 for processing locally. Similarly, the bypass application receives communications from the MFS 110, which are fed to the voice assistant application for output as though received from the cloud-based service. Stated differently, the bypass application acts as a man-in-the-middle to reroute communications to/from the untrusted cloud-based service to/from the trusted MFS 110.

Figure 2A:
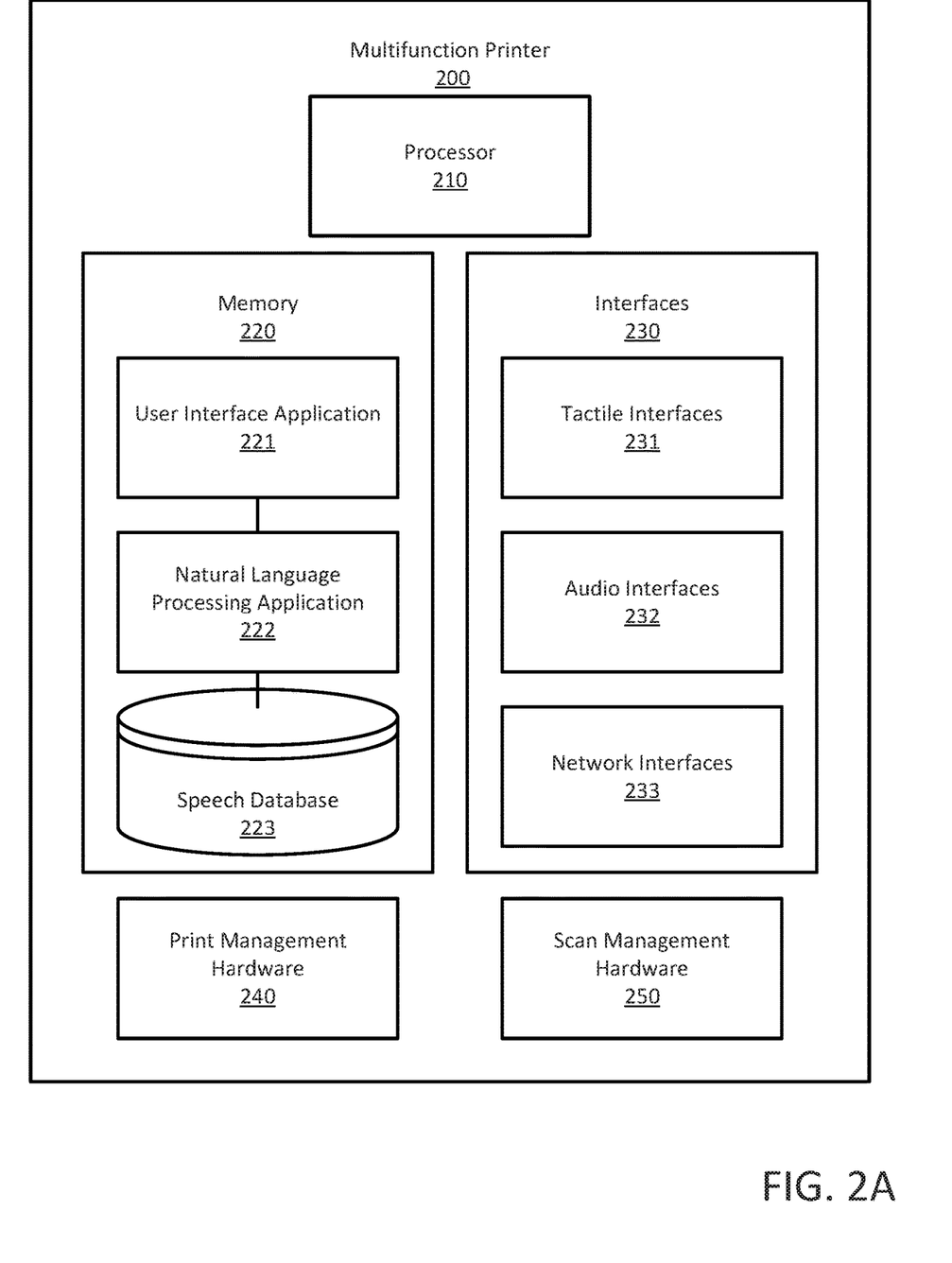
FIGS. 2A and 2B illustrate hardware of a multifunction systems, according to aspects of the present disclosure.
Figure 2B:
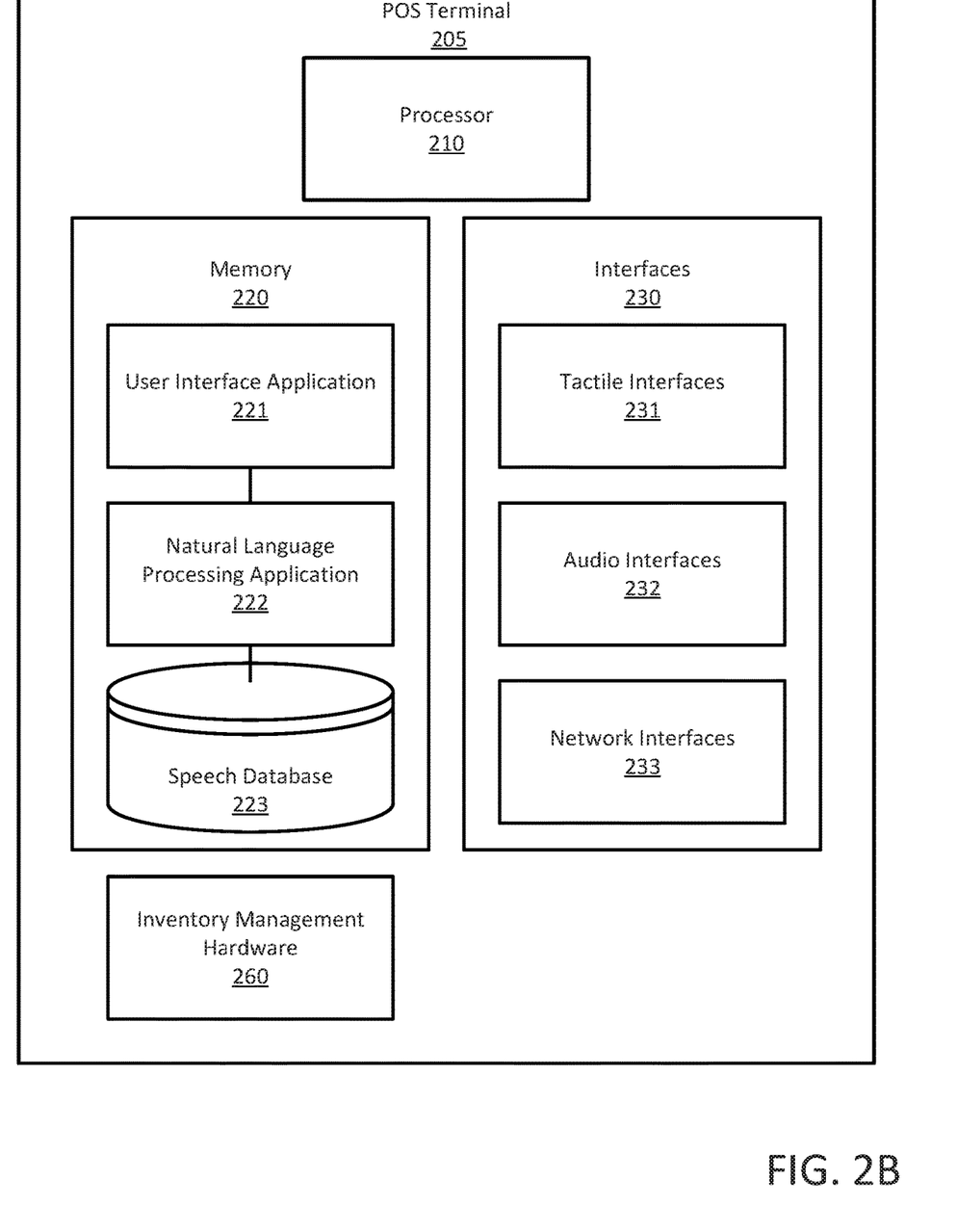

FIGS. 2A and 2B illustrate hardware of an MFP 110, according to aspects of the present disclosure. In FIG. 2A, the hardware of an MFP 110 of a MFP 200 is shown, which includes a processor 210, a memory 220, and an interface 230, and may include other components such print management hardware 240, scan management hardware 250, battery backup, additional storage, additional input devices, additional output devices, etc. In FIG. 2B, the hardware of an MFP 110 of a POS terminal 205 is shown, which includes a processor 210, a memory 220, and an interface 230, and may include other components such as inventory management hardware 260, battery backup, additional storage, additional input devices, additional output devices, etc. The print management hardware 240, scan management hardware 250, and the inventory management hardware 260 can be collectively referred to as task management hardware for an MFS 110, and are provided as non-limiting examples of hardware configured to provide one or more functions of the MFS 110. The MFS 110 is generally under the control of an operating system (not shown). The processor 210 is included to be representative of a single CPU (Central Processing Unit), multiple CPUs, a single CPU having multiple processing cores, and the like.

The memory 220 may be a persistent or a volatile storage device. Although the memory 220 is shown as a single unit, the memory 220 may be a combination of fixed and/or removable non-transient computer readable memory storage devices, such as fixed disc drives, solid state drives, SAN storage, NAS storage, removable memory cards or optical storage. The memory 220 may be part of one virtual address space spanning multiple primary and secondary storage devices.

As shown, the memory 220 includes a user interface application 221, a natural language processing application 222, and a speech database 223. The user interface application 221 can include the software instructions, Application Program Interfaces (APIs), and drivers needed to receive inputs from (e.g., utterances 140, physical button pushes from the MFS 110 and/or an assistive computing device via a network connection) and provide outputs to (e.g., GUI updates, audio outputs 150) the various control hardware of the MFS 110 and/or an assistive computing device. The natural language processing application 222 receives raw audio from the user interface application and identifies the action intent(s) from the raw audio. The natural language processing application 222 is in communication with a speech database 223 to identify and map various phonemes in the spoken utterance 140 that can be mapped to known words from which the linguistic intent of the user can be determined.

The interfaces 230 may be any type of device to manage input to or output from the MFS 110 and can include tactile interfaces 231 (e.g., push-buttons, selector switches, and touch screens) to receive manual inputs from users, audio interfaces 232 (e.g., microphones and speakers) to provide audio outputs and accept audio inputs from users, and network interfaces 233 that enable the MFS 110 to communicate with other computers (e.g., NFC scanners, WiFi antennas, Bluetooth antennas, Ethernet ports). The tactile interfaces 231 can include the control panel 111 of the MFS 110, the audio interfaces 232 can include a vocalization module 112 of the MFS 110, and the network interfaces 233 can include the NFC module 113 of the MFS 110.

The print management hardware 240 includes the components of the MFP 200 used to manipulate paper. The print management hardware 240 includes the rollers, feeders, trays, motors, etc. to move paper from one location in the MFP 200 to another location, and the heaters, sprayers, reservoirs/cartridges, lasers, etc. to impart an image onto those papers. The print management hardware 240 also includes the sensors used to detect how paper is moving throughout the MFP 200 and whether a flow error (e.g., a paper jam, a tray being out of stock, low ink/toner levels) has occurred.

The scan management hardware 250 includes the components of the MFP 200 used to recognize an image on a supplied document, and to output that image to a paper managed by the print management hardware 240 (e.g., when making copies) and/or to an external computing device (e.g., when faxing or scanning the document). Various imaging hardware including charge-coupled devices, contact image sensors, photomultiplier tubes, rotary arrays of charge-couple devices, digital cameras, or the like can be used for imaging hardware in the scan management hardware 250. The scan management hardware 250 can also include the rollers, feeders, trays, etc. to move supplied documents into view and out of view of the imaging hardware.

The inventory management hardware 260 includes the components of the POS terminal 205 used to recognize objects to include in a transaction and process those objects. Various inventory management hardware 260 including optical barcode scanners, Radio Frequency Identification (RFID) scanners, RFID deactivators, loss prevention cameras, item recognition cameras, scales, conveyors, or the like can be used in the inventory management hardware 260.

Figure 3:
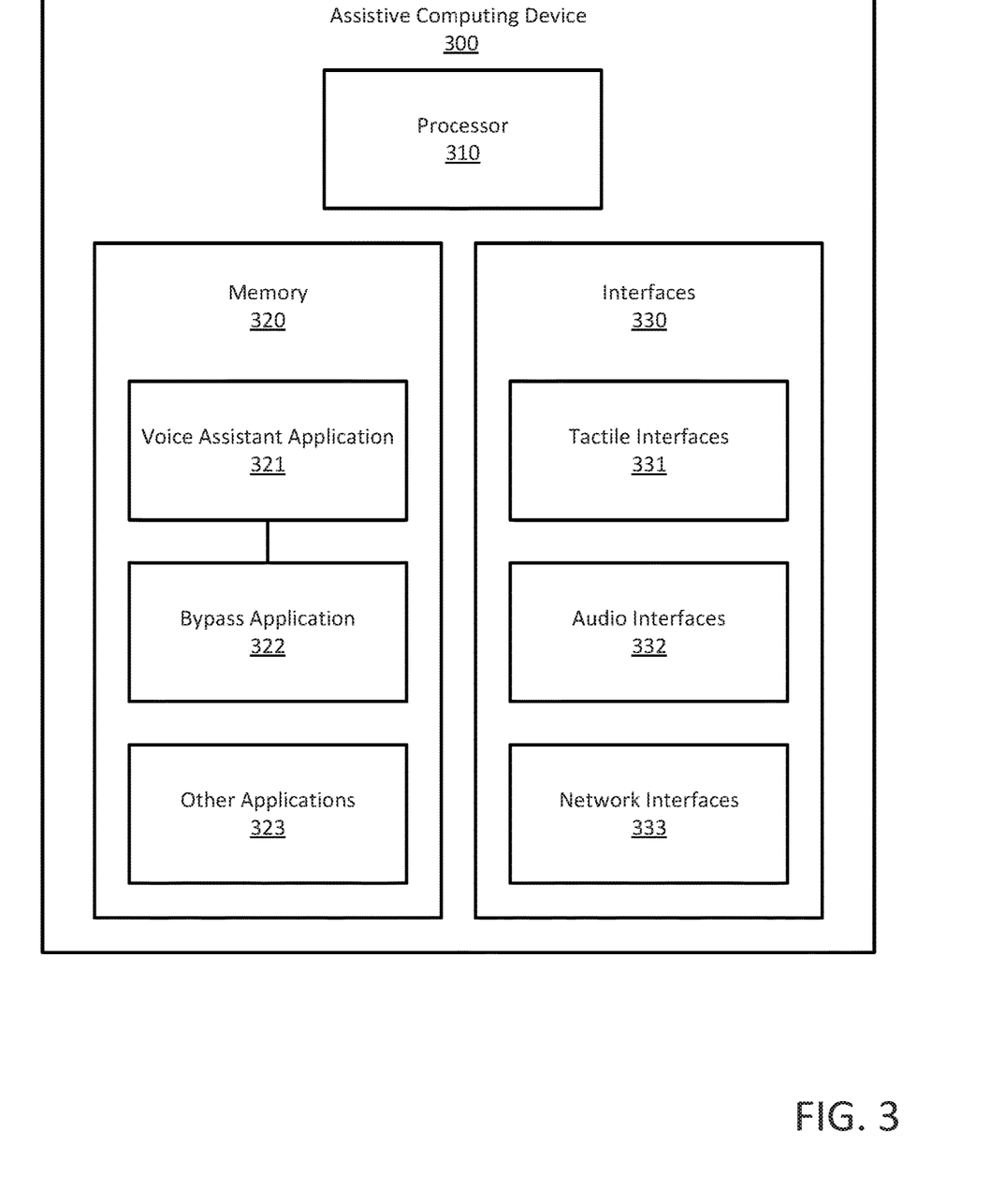
FIG. 3 illustrates hardware of an assistive computing device, according to aspects of the present disclosure.

FIG. 3 illustrates hardware of an assistive computing device 300, according to aspects of the present disclosure, that includes a processor 310, a memory 320, and an interface 330, and may include other components such as a microphone, a speaker, a power supply, additional storage, additional input devices, and additional output devices. The assistive computing device 300 is generally under the control of an operating system (not shown). The processor 310 is included to be representative of a single CPU, multiple CPUs, a single CPU having multiple processing cores, and the like The memory 320 may be a persistent or a volatile storage device. Although the memory 320 is shown as a single unit, the memory 320 may be a combination of fixed and/or removable non-transient computer readable memory storage devices, such as fixed disc drives, solid state drives, SAN storage, NAS storage, removable memory cards or optical storage. The memory 320 may be part of one virtual address space spanning multiple primary and secondary storage devices.

As shown, the memory 320 includes a voice assistant application 321, a bypass application 322, and may include other applications 323 (including Operating Systems for the assistive computing device 300). The voice assistant application 321 manages the input to the microphone and output from the speakers of the assistive computing device 300 to provide voice control and audio feedback to a user. The bypass application 322 interacts with the voice assistant application 321 to encapsulate external communications between the voice assistant application 321 and a cloud-based natural language processing service used by the voice assistant application 321, and instead either drops the transmissions or sends the audio inputs to a natural language processing service associated with an MFS 110 (e.g., an MFP 200 or POS terminal 205) paired with the assistive computing device 300. In various aspects, the bypass application 322 acts as a man-in-the-middle; rerouting the network communications of the voice assistant application 321 from a cloud-based service to the MFS 110.

The interfaces 330 may be any type of device to manage input to or output from the assistive computing device 300 and can include tactile interfaces 331 (e.g., push-buttons, selector switches, and touch screens) to receive manual inputs from users, audio interfaces 232 (e.g., microphones and speakers) to provide audio outputs and accept audio inputs from users, and network interfaces 233 that enable the assistive computing device 300 to communicate with other computers (e.g., NFC scanners, WiFi antennas, cell antennas, Ethernet ports, Bluetooth antennas).

Figure 4:
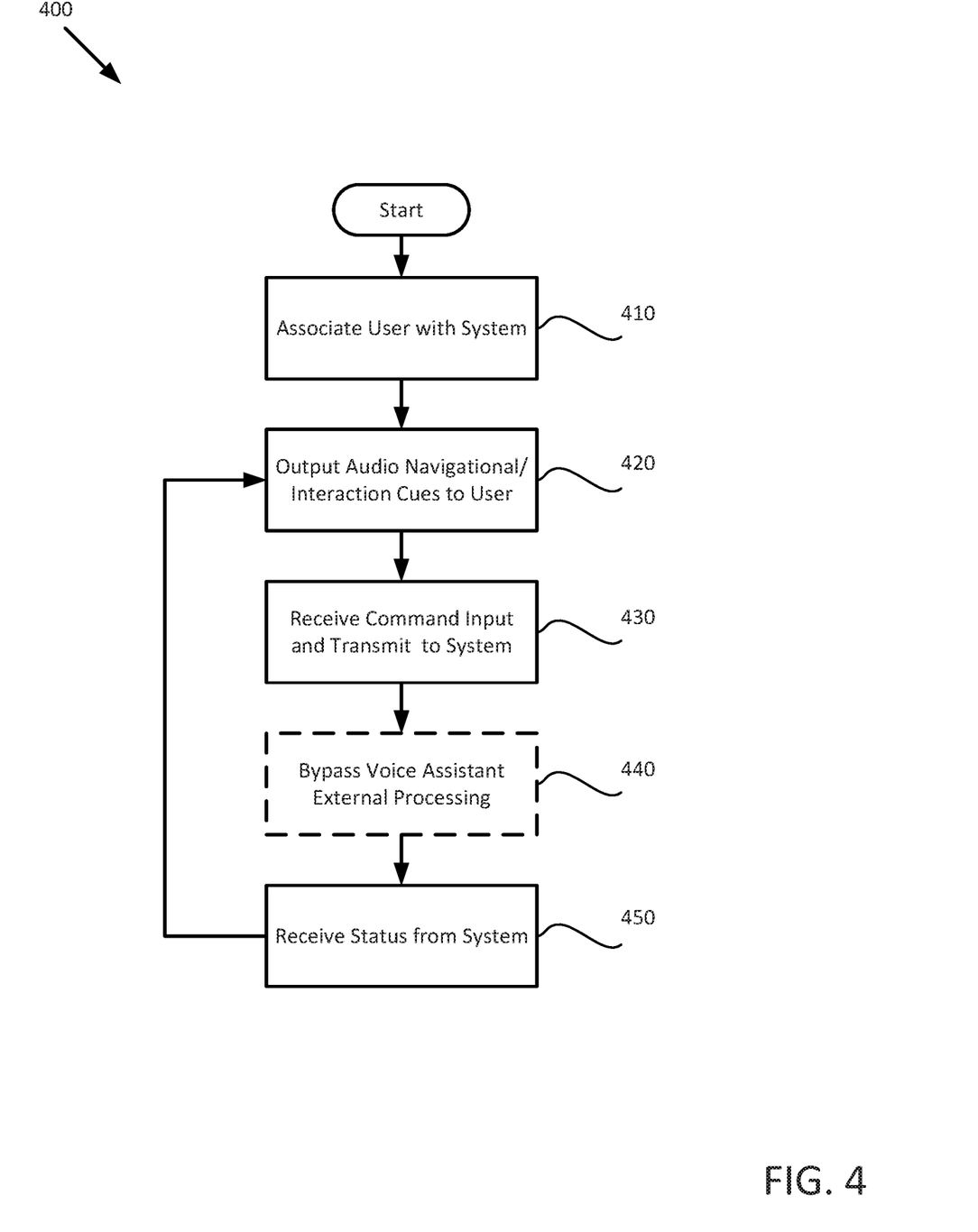
FIG. 4 is a flowchart of a method for controlling tasks on a multifunction system using an assistive computing device, according to aspects of the present disclosure.

FIG. 4 is a flowchart of a method 400 for controlling tasks on an MFS 110 using an assistive computing device 300, according to aspects of the present disclosure. For example, method 400 may be used to manage print tasks on an MFP 110, or to manage a checkout procedure on a POS terminal 205.

Method 400 begins with block 410, where the assistive computing device 300 associates the user with an MFS 110. In various aspects, the assistive computing device 300 can use various technologies and schemas for associating the user with the MFS 110, including a NFC link between the two devices, a Bluetooth link between the two devices, or a LAN connection between the two devices (and an intervening router). During association, user credentials are passed to the MFS 110 from the assistive computing device 300, which can include a username, a password, and account preferences (or the MFS 110 can look up the account preferences associated with the username from a domain controller system). The account preferences can specify identifying information (e.g., to use in faxes for return information, email addresses to use for "send to self" scans, digital signatures, loyalty program identifiers), encryption keys to use, and setup preferences to designate which assistive computing device 300 to use and how to interact with the designated assistive computing device. In some aspects, the assistive computing device 300 includes a separate device from the MFS 110, including at least one of a mobile phone, a tablet, or an accessibility device. In some aspects, the assistive computing device 300 includes a vocalization module 112 of the MFS 110.

At block 420, the assistive computing device 300 provides an audio output 150 of navigational or interaction cues for the user. When the user is first associated with the MFS 110, the assistive computing device 300 outputs an initial audio interaction cue to the user based on an initial status of the MFS 110. For example, the audio output 150 may initially convey to the user that the GUI is currently located at a main menu, and some (or all) of the options available from the main menu. In a further example, the audio output 150 may initially convey which MFS 110 of a plurality of MFSs 110 the user has associated with (e.g., "you are associated with printer two"). The MFS 110 provides the audio outputs 150 to the assistive computing device 300 (which in turn can provide the audio output 150 to a secondary device, such as a set of headphones) and can periodically provide the current navigational or interaction cue again to the user (e.g., repeating menu options), or provide an updated status to the assistive computing device 300 in response to receiving command inputs from the assistive computing device 300 (e.g., confirming an action intent, indicating that an action has been performed, requesting additional inputs).

At block 430, the assistive computing device 300 receives a command input and transmits the command input to the associated MFS 110. In various aspects, the command input can include utterances 140 received from a microphone of the assistive computing device 300 and/or physical inputs (e.g., on a touch screen, on a button). When the command input includes physical button presses on the assistive computing device 300, indications of which buttons (including touchscreen elements) have been pressed are transmitted from the assistive computing device 300 to the MFS 110 for processing in relation to the GUI provided by the MFS 110. When the command input includes an utterance 140, the assistive computing device 300 offloads processing of the natural language sequence to the MFS 110 and transmits the raw audio to the MFS 110 for processing. In various aspects, the MFS 110 can process the utterances 140 in relation to the GUI (e.g., as formatted audio commands to select elements present in the GUI or audio-communicated status of the MFS 110) or as natural language sequences that are processed to identify an action intent without reference to the GUI (e.g., stating what the user wants the MFS 110 to do).

In aspects in which the assistive computing device 300 handles audio input and output via a voice assistant application associated with a cloud-based natural language processor, method 400 includes block 440, where a bypass application executing on the assistive computing device 300 bypasses the external processing normally used by the voice assistant application. For example, the bypass application intercepts and repackages communications from the voice assistant application addressed to an external cloud-based natural language processor and redirects those communications to a natural language processor locally provided by the MFS 110.

At block 450, the assistive computing device 300 receives the updated status from the MFS 110 based on the actions implemented by the MFS 110 in response to the command inputs provided (per block 430) from the assistive computing device 300. In some aspects, the updated status can indicate a new menu, or new status or focus on a current menu (e.g., a copies field now reads two when previously indicating one, a copies field is selected when previously a paper selection field was selected). In some aspects, the updated status can indicate that an action is being performed by the MFS 110 (e.g., "six copies are being made in grayscale, for delivery to tray two"). In some aspects, the updated status can indicate that the MFS 110 is ready for a user action (e.g., "please place the Avocados on the scale," "please remove the Onions from the bagging area and rescan"). Method 400 may return to block 420 to output an updated audio interaction cue to the user via the assistive computing device 300 based on the status received per block 450.

Figure 5:
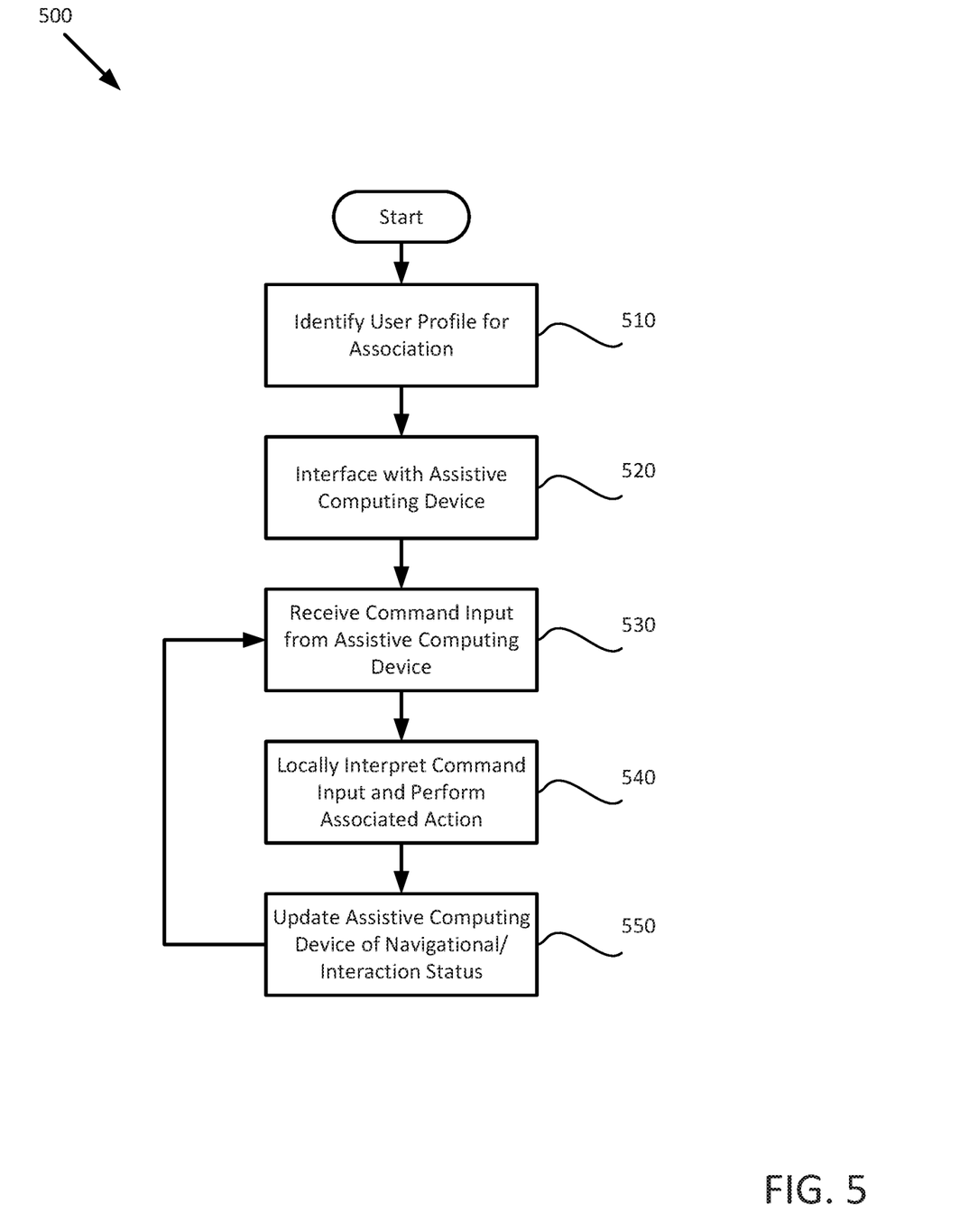
FIG. 5 is a flowchart of a method for managing tasks on a multifunction system when coordinating with an assistive computing device, according to aspects of the present disclosure.

FIG. 5 is a flowchart of a method 500 for managing tasks on an MFS 110 when coordinating with an assistive computing device 300, according to aspects of the present disclosure. Method 500 begins with block 510, where the MFS 110 identifies a user profile to activate for association with a use session. In various aspects, the MFS 110 identifies the user profile as part of a handshake procedure with a user device 120 or a keycard 130 that supplies various credentials over a wireless link with the MFS 110. For example, a NFC, a Bluetooth, or WiFi connection between the MFS 110 and the user device 120 or keycard 130 can identify which user is attempting to connect with the MFS 110 and how that user's request should be handled by the MFS 110.

At block 520, the MFS 110 interfaces with an assistive computing device 300 associated with the user profile (identified per block 510). The assistive computing device 300 can include various personal user devices 120 and/or a vocalization module 112 of the MFS 110 that are configured to receive utterances 140 as inputs and produce audio outputs 150 as outputs. As will be appreciated, the assistive computing device 300, in addition to or instead of producing audio input/output, can also receive tactile inputs and provide alternative video outputs (e.g., an alternative GUI to that provided by the MFS 110). The interfacing between the MFS 110 and the assistive computing device 300 can occur over the same or a different channel/transmission standard than that used to handle the association request. For example, a user can associate with the MFS 110 (per block 510) via NFC, but establish a data connection between the assistive computing device 300 and the MFS 110 via a WiFi or Bluetooth communications link or tunnel. In another example, a user can associate with the MFS 110 via an NFC handshake, but select the vocalization module 112 as the assistive computing device 300, which can send communications via wires to the MFS 110 for processing.

At block 530, the MFS 110 receives a command input from the assistive computing device 300. In various aspects, the command inputs can include button presses made on the assistive computing device 300 that the MFS 110 interprets as selecting or cycling through elements of the GUI provided by the MFS 110. In some aspects, the command inputs can include formatted language commands, which are utterances 140 that use particular words and word orders to specify an action intent of the user (e.g., relative to a communicated status of the MFP 110). In further aspects, the command inputs can include natural language commands, which are utterances 140 that use normal speech patterns to specify an action intent of the user.

At block 540, the MFS 110 locally interprets the command input (received per block 530), and performs the associated action. In various aspects, the command input is interpreted according to a current status of the MFS 110, including where the GUI has focus. For example, when receiving an utterance of "increase," the MFS 110 can interpret the utterance to increase the number of copies, increase the contrast of the printed copies, increase a scaling factor for how to transfer a scanned image to a page, increase a size of the paper used (e.g., from A4 to A3), etc., depending on what field has focus (e.g., according to physical button selection commands or previous command utterances 140). In some aspects, the command input is provided as a natural language utterance 140, which the MFS 110 locally processes (e.g., using a natural language processing application 222 and a speech database 223) to identify one or more action intents from the utterance 140. For example, when a user says "I want six copies, not color, using A4 paper," the MFS 110 can extract action intents from the utterance 140 indicating that the user desires that copies be made of a provided document, that the desired action is to be repeated six times, that a grayscale or black and white color scheme is to be used, and that a particular size of paper is to be used. In various aspects, when the MFS 110 locally performs the analysis of the utterances 140, the MFS 110 and the assistive computing device 300 are bypassing a typical processing pathway for a voice assistant application executing on the assistive computing device 300 and preventing audio from being transmitted to a cloud-based natural language processor.

Once the action intents from the command inputs are determined, the MFS 110 then performs the action using various subsystems (e.g., print management hardware 240, scan management hardware 250, and/or inventory management hardware 260).

At block 550, the MFS 110 updates the assistive computing device 300 with a navigational or interaction status in response to performing the action (per block 540). For example, the MFS 110 can transmit a status update for the assistive computing device 300 to generate an audio output 150 based on that lets the user know that the MFS 110 has navigated or given focus to a given GUI element, has performed a task as directed, is seeking clarification or further input on how to perform a task, or that the tasks has encountered an error (e.g., a paper jam, low toner, no image scanned, no tone or busy tone for sending a fax, barcode not recognized, etc.). Method 500 may then return to block 530, where the MFS 110 receives and acts on additional or further commands.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    associating a user with a multifunction system via a voice assistant application provided by an assistive computing device associated with the user, wherein the voice assistant application operates in an active mode by capturing raw audio in an environment and transmitting the raw audio to a cloud-based service for audio processing;
    in response to associating the user with the multifunction system, initiating a bypass application on the assistive computing device:
    outputting an initial audio interaction cue to the user based on an initial status of the multifunction system via the assistive computing device associated with the user;
    receiving command inputs from the user via the voice assistant application;
    rerouting, via the bypass application, transmission of the command inputs from the voice assistant application to the multifunction system, thereby bypassing the cloud-based service;
    receiving an updated status from the multifunction system based on the command inputs; and
    outputting an updated audio interaction cue to the user via the assistive computing device based on the updated status.

2. The method of claim 1, wherein the command input is an utterance that includes a natural language sequence, where the assistive computing device offloads processing of the natural language sequence to the multifunction system when transmitting the raw audio.

3. The method of claim 1, wherein the assistive computing device is a module of the multifunction system activated in response to associating the user with the multifunction system and identifying that the user prefers to provide the command inputs via the assistive computing device rather than a graphical user interface provided by a tactile interface of the multifunction system.

4. The method of claim 1, wherein the command inputs include physical button selections received from the assistive computing device.

5. A method, comprising:
    in response to receiving an association request, identifying a user profile to activate;
    interfacing with an assistive computing device associated with the user profile, wherein the assistive computing device includes a voice assistant application in communication with a cloud-based service for audio-processing, a bypass application, a microphone and a speaker;
    receiving raw audio of an utterance captured by the microphone of the assistive computing device via the voice assistant application, wherein the bypass application reroutes transmission of the raw audio from the voice assistant application to a multifunction system, thereby bypassing the cloud-based service;

locally processing, by the multifunction system, the utterance according to a natural language processor to identify an action intent included in the utterance;

performing the action intent via at least one subsystem of a multifunction system; and transmitting a status of the multifunction system performing the action intent to the assistive computing device for output via the speaker.

6. The method of claim 5, wherein the association request is received via a near field communication (NFC) interface between the multifunction system and the assistive computing device.

7. The method of claim 5, wherein the association request is received via a near field communication (NFC) interface of the multifunction system from a keycard providing user credentials for the user profile and identifying the assistive computing device as one of:

a personal computing device for a user; and a verbalization module of the multifunction system.

8. The method of claim 5, further comprising:

receiving an indication of physical button pushes from the assistive computing device; and wherein identifying the action intent included in the utterance includes interpreting the indication of the physical button pushes.

9. The method of claim 5, wherein the action intent includes a navigation command, wherein performing the action intent causes a graphical user interface subsystem of the multifunction system to navigate from a first state to a second state in the graphical user interface subsystem.

10. The method of claim 5, wherein the action intent includes activation of at least one of print management hardware and scan management hardware included in a multifunction printer operating as the multifunction system.

11. A computing device, comprising:

task management hardware;

a tactile interface;

a processor; and a memory storage device, including instructions, that when executed by the processor provide enable the computing device to perform an operation including:

displaying a graphical user interface (GUI) via the tactile interface;

in response to receiving an association request, identifying a user profile to activate;

interfacing with an assistive computing device associated with the user profile, wherein the assistive computing device includes a voice assistant application, a bypass application, a microphone and a speaker;

receiving raw audio of an utterance captured by the microphone of the assistive computing device via the voice assistant application, wherein the bypass application reroutes transmission of the raw audio to the computing device, thereby bypassing a cloud-based service associated with the voice assistant application for audio processing;

locally processing, by the computing device, the utterance according to a natural language processor to identify an action intent included in the utterance;

performing the action intent using the task management hardware; and transmitting a status of performing the action intent to the assistive computing device for output via the speaker.

12. The computing device of claim 11, further comprising:

a module incorporating the assistive computing device.

13. The computing device of claim 11, wherein the association request is received via a near field communication (NFC) interface between a keycard providing user credentials for the user profile and identifying a personal computing device for a user for use as the assistive computing device.

14. The computing device of claim 11, wherein the association request is received via a local area network to which the computing device and the assistive computing device are connected.

15. The computing device of claim 11, wherein identifying the action intent included in the utterance further includes interpreting indications of physical button pushes made on the assistive computing device.

16. The computing device of claim 11, wherein the action intent includes a navigation command, wherein performing the action intent causes the GUI to navigate from a first state to a second state.

* * * * *